Jan. 17, 1950     G. H. BOGENHAGEN     2,495,089
ADJUSTABLE BELT PULLEY ASSEMBLY
Filed June 4, 1948

INVENTOR.
GUSTAVE H. BOGENHAGEN
BY
McMorrow, Berman & Davidson
ATTORNEYS

Patented Jan. 17, 1950

2,495,089

UNITED STATES PATENT OFFICE 2,495,089

ADJUSTABLE BELT PULLEY ASSEMBLY

Gustave H. Bogenhagen, Cheyenne Wells, Colo.

Application June 4, 1948, Serial No. 31,088

3 Claims. (Cl. 287—52.06)

This invention relates to improvements in belt pulley assemblies and more particularly to an improved hub structure for accommodating a pulley to shafts of different diameters.

It is among the objects of the invention to provide an improved belt pulley assembly which is effective to firmly secure a belt pulley on shafts of different diameters in a perfectly centered and true position and against any possibility of the pulley turning on the shaft under normal torque loads, which assembly includes a minimum number of simple parts, has an extremely wide range of adjustment, and is durable in construction and economical to manufacture.

Other objects and advantages will become apparent from a consideration of the following description and the appended claims in conjunction with the accompanying drawing wherein:

Figure 1:
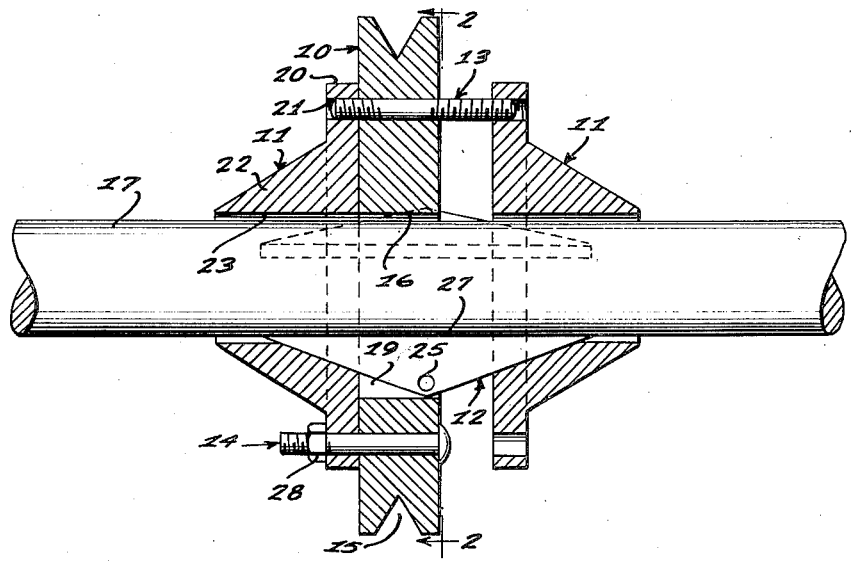
Figure 1 is a longitudinal, medial cross section through a belt pulley assembly illustrative of the invention.
Figure 2:
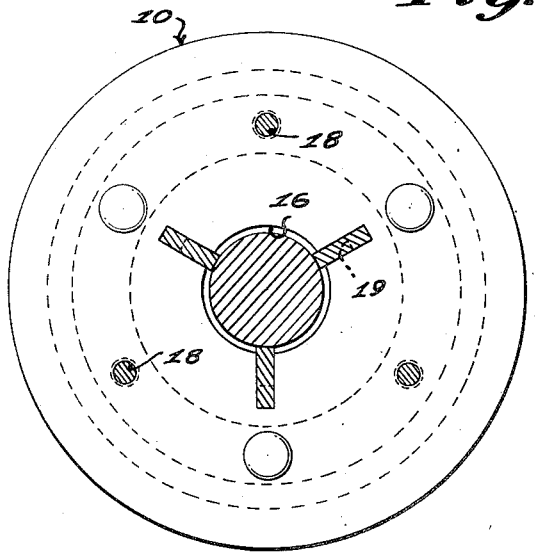
Figure 2 is a transverse cross section taken substantially on the line 2—2 of Figure 1.
Figure 3:
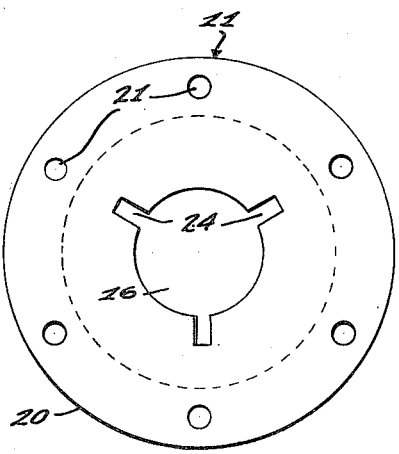
Figure 3 is an end elevation of one of the two hubs of the assembly.

With continued reference to the drawing, the improved belt pulley assembly comprises, in general, a disc shaped belt pulley 10, a pair of hubs 11, a plurality of flat, triangular wedges 12, a plurality of threaded studs 13 and a plurality of bolts 14.

The pulley 10 is a circular, disc shaped member having flat, substantially parallel sides, a peripheral groove 15 for a V belt, a central aperture 16 receiving the shaft 17, a plurality of angularly spaced transverse apertures 18, preferably arranged along a circumference intermediate the central aperture 16 and the periphery of the disc, and angularly spaced flat slots 19 extending radially outwardly from the central aperture 16.

Each hub member 11 comprises a circular body having a marginal annular flange 20 provided with angularly spaced apertures 21 arranged around a circumference corresponding in diameter to the circumference on which the apertures 18 of pulley 10 are centered, and an outwardly extending annular boss 22 having a central shaft receiving aperture 23 which extends entirely through the hub, said boss preferably having a conically shaped outer surface tapering from the inner edge of flange 20 to the outer end of the boss. Each hub member is also provided with a plurality of angularly spaced flat slots 24 extending radially outwardly from the central aperture 23. The radially outer edges of these slots are inclined inwardly at an acute angle from the side of the hub member opposite the boss toward the outer end of the boss and are of substantially the same width as the slots 19 provided in the pulley 10 and have the same angular spacing.

Figure 4:
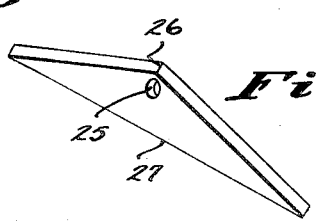
Figure 4 is a perspective view of a triangular wedge constituting an operative component of the improved assembly.

Each wedge 12, as particularly illustrated in Figure 4, is a flat body in the shape of an acute isosceles triangle having flat, substantially parallel sides, straight edges and an aperture 25 extending therethrough adjacent the apex 26 opposite the base edge 27.

In assembling the device the belt pulley 10 is placed on the shaft 17 and an individual wedge 12 is disposed in each of the pulley slots 19 with its base edge 27 directed toward the surface of shaft 17. The two hubs 11 are then placed on the shaft, one at each side of the pulley with the respective bosses 22 directed outwardly away from the pulley. The bolts 14 are extended through registering apertures in the pulley and the flange of one of the hub members and respective nuts 28 are threaded onto these bolts to secure the pulley to the hub to which the pulley is attached. The studs 13, each of which has its opposite end portions threaded in opposite directions, are then passed through the remaining apertures in the pulley and into contact with the pulley adjacent ends of the corresponding hubs in alignment with the flange apertures in said hubs. These apertures are internally screw threaded to receive the screw threaded ends of the studs. The wedges 12 are then moved toward the pulley attached hub until they are pressed against the shaft in the wedge securing slots in this hub. The other hub is then moved up to the corresponding ends of the studs and the studs are then rotated to draw the two hubs together forcing the wedges inwardly by contact of the inclined outer edges of the wedges with the inclined outer surfaces of the hub slots. The studs are tightened until the wedges are forced into sufficiently firm contact with the shaft to preclude any rotation of the pulley on the shaft under the normal torque loads. Because of the triangular formation of the wedges, the identity of size and shape of the wedges and wedge receiving slots and the equality of pressure applied to all of the wedges by drawing the two hubs together, the pulley will be exactly centered on the shaft and firmly secured thereon against both lateral and rotational movement relative to the shaft.

In the arrangement illustrated there are three wedge receiving slots in the belt pulley and three such slots in each of the hubs, and, of course, three wedges for these slots. Three wedges have been found sufficient to properly center the belt pulley and firmly secure it on the shaft against the usual torque loads to which such pulleys are subjected. However, a larger number of wedges and a correspondingly increased number of wedge receiving slots may be used if desired. The belt pulley may also be formed with circumferential cut-out portions to reduce its weight and may have two or more belt grooves instead of the single groove illustrated, the illustration being that of the simplest form of the improved assembly. The apertures 25 in the wedges are for connecting a set of identical wedges together by a suitable wire or other fastening means and for storing the wedges when not in use by suspending them from a nail or hook. Each adjustable assembly 11 will accommodate the belt pulley to an extremely wide range of shaft diameters and the assemblies may be made in different sizes to take care of shaft variations beyond the range of variations accommodated by an assembly of a particular size.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An adjustable belt pulley assembly comprising a disc shaped pulley having a peripheral groove, and having a central shaft receiving aperture and angularly spaced-apart slots extending radially outward from said aperture, triangularly shaped wedges having a thickness substantially equal to the circumferential thickness of said slots disposed one in each slot in position to bear upon a shaft extending through said aperture, a pair of centrally apertured hubs disposed one at each side of said pulley in position to receive a shaft extending through the pulley, each of said hubs having a circumferential flange provided with angularly spaced apart, screw-threaded apertures, each of said hubs having therein angularly-spaced-apart triangular slots extending outwardly from the hub aperture therein to receive the corresponding ends of said triangularly-shaped wedges, bolts extending through said pulley and threaded into the screw-threaded apertures in said hub flanges to pull said hubs toward each other upon said wedges to force said wedges inwardly in a shaft engaging direction, and bolts securing said pulley to at least one of said hubs.

2. An adjustable belt pulley assembly comprising a disc shaped pulley having a peripheral groove and having apertures therethrough including a central shaft receiving aperture, said pulley also having angularly spaced slots extending radially from said central aperture, triangularly shaped wedges respectively received in said slots, a pair of hubs each having a central, shaft receiving opening therethrough and having tapered, wedge receiving slots extending radially from the central opening, and angularly spaced apart, screw-threaded apertures adjacent their peripheries, and bolts extending through said pulley and threaded into the screw-threaded apertures in said hubs to force said hubs together and thereby force said wedges into engagement with a shaft extending through said central apertures.

3. An adjustable belt pulley assembly comprising a disc shaped pulley having a central shaft receiving aperture and angularly spaced wedge receiving slots extending radially from said aperture, a triangularly shaped wedge in each slot, a pair of hubs each having a central, shaft receiving opening, disposed one at each side of said pulley and operatively engaging the corresponding ends of said wedges to force said wedges inwardly of said central apertures when said hubs are drawn together, and means extending between said hubs operative to adjustably draw them together.

GUSTAVE H. BOGENHAGEN.

REFERENCES CITED

The following references are of record in the file of this patent:

UNITED STATES PATENTS

| Number | Name | Date |
| --- | --- | --- |
| 215,345 | Forbes | May 13, 1879 |
| 258,797 | Newell | May 30, 1882 |
| 262,211 | Emerson | Aug. 8, 1882 |